(12) United States Patent
Wurtz et al.

(10) Patent No.: US 8,476,327 B2
(45) Date of Patent: Jul. 2, 2013

(54) EXTRUDED POLYMER FOAM PROCESS WITH STAGED FORMING

(75) Inventors: Bertrand Wurtz, Offendorf (FR); Van-Chau Vo, Souffelweyersheim (FR)

(73) Assignee: Dow Global Technologies LLC, Midland, MI (US)

( * ) Notice: Subject to any disclaimer, the term of this patent is extended or adjusted under 35 U.S.C. 154(b) by 130 days.

(21) Appl. No.: 13/145,295

(22) PCT Filed: Feb. 24, 2010

(86) PCT No.: PCT/US2010/025187
§ 371 (c)(1),
(2), (4) Date: Jul. 19, 2011

(87) PCT Pub. No.: WO2010/101747
PCT Pub. Date: Sep. 10, 2010

(65) Prior Publication Data
US 2012/0004333 A1    Jan. 5, 2012

Related U.S. Application Data

(60) Provisional application No. 61/157,217, filed on Mar. 4, 2009.

(51) Int. Cl.
*C08J 9/08* (2006.01)
*C08F 12/08* (2006.01)

(52) U.S. Cl.
USPC ............. 521/79; 521/146; 264/51; 264/53; 264/55

(58) Field of Classification Search
USPC .................. 264/51, 53, 55; 521/79, 146
See application file for complete search history.

(56) References Cited

U.S. PATENT DOCUMENTS

| | | | | |
|---|---|---|---|---|
| 4,424,287 A * | 1/1984 | Johnson et al. | | 521/74 |
| 4,435,345 A | 3/1984 | Colombo | | |
| 4,536,357 A | 8/1985 | Hayashi et al. | | |
| 4,663,360 A * | 5/1987 | Park et al. | | 521/86 |
| 5,332,761 A * | 7/1994 | Paquet et al. | | 521/79 |
| 6,225,364 B1 * | 5/2001 | Chaudhary et al. | | 521/82 |
| 6,528,548 B2 * | 3/2003 | Hayashi et al. | | 521/79 |
| 2002/0048614 A1 | 4/2002 | Kitayama et al. | | |
| 2006/0022366 A1 | 2/2006 | Iwamoto et al. | | |

* cited by examiner

*Primary Examiner* — Irina S Zemel
(74) *Attorney, Agent, or Firm* — Steven W. Mork

(57) ABSTRACT

Prepare an extruded polymeric foam by extruding a foamable polymer composition through a foaming die and allowing the foamable polymer composition to expand into a polymer foam as it travels through and is constrained in its thickness dimension by at least two constraining sections, the first having opposing essentially parallel forming plates and the second constraining section having forming plates spaced further apart than the first constraining section.

11 Claims, No Drawings

EXTRUDED POLYMER FOAM PROCESS WITH STAGED FORMING

CROSS REFERENCE STATEMENT

This application claims the benefit of U.S. Provisional Application No. 61/157,217, filed Mar. 4, 2009, the entire content of which is incorporated herein by reference.

BACKGROUND OF THE INVENTION

1. Field of the Invention

The present invention relates to a process for preparing extruded polymeric foam.

2. Description of Related Art

Extrusion processes for preparing polymeric foam include three basic steps: (1) providing a foamable polymer composition at an initial pressure and temperature in an extruder; (2) expelling the foamable polymer composition into a zone of lower pressure; and (3) allowing the foamable polymer composition to expand into polymeric foam. The third step can occur with or without constraint on the expanding foamable polymer composition. Such a general process works well for many types of extruded polymeric foams but offers little control over foam expansion. Consequently, inhomogeneous foam properties develop when preparing extruded polymeric foams requiring large thickness expansion ratios. Important inhomogeneities in density and compressive strength often appear along the thickness dimension of extruded polymeric foam when prepared by a typical extrusion process. These inhomogeneities become apparent when the expanding foam undergoes an expansion ratio of 30:1 or more in its thickness dimension. Nonetheless, expansion ratios of 30:1 or more are desirable for preparing low density and/or thick polymeric foam such as foam having a thickness of 100 millimeters or more.

It is desirable and would advance the art of extruded polymeric foam to identify a process for directly preparing polymeric foam having a thickness expansion ratio in excess of 30:1 while also having an essentially uniform density and compressive strength along the thickness dimension.

BRIEF SUMMARY OF THE INVENTION

The present invention advances the art of extruded polymeric foam by solving the problems necessary to provide a process for directly preparing polymeric foam having a thickness expansion ratio in excess of 30 to one while also having an essentially uniform density and compressive strength profile along the foam's thickness dimension.

In a first aspect, the present invention is a process for extruding polymeric foam comprising the following steps: (a) providing a foamable polymer composition in an extruder at an initial temperature and an initial pressure, the foamable polymer composition comprising a blowing agent and a polymer matrix that comprises a polymer component with a softening temperature, the initial temperature exceeding the softening temperature of the polymer component and the initial pressure high enough to preclude foaming of the foamable polymer composition; and (b) extruding the foamable polymer composition in an extrusion direction into an atmosphere at a pressure below the initial pressure and allowing the foamable polymer composition to expand into a polymeric foam prior to cooling to a temperature below the softening point of the foamable polymer composition; wherein prior to cooling to a temperature below the softening point in step (b), the foamable polymer composition expands with a thickness expansion ratio of at least 30:1 while traveling through and contacting opposing forming plates that provide at least two sequential constraining sections along the extrusion direction, the forming plates in each constraining section comprising essentially parallel constraining walls that restrict expansion of the foamable polymer composition in a thickness dimension and wherein the constraining section closest to the extruder has essentially parallel walls defining a spacing in the thickness dimension that is smaller than the spacing of parallel walls defining the second constraining section.

Embodiments of the present invention can further comprise any one or any combination of more than one of the following characteristics: the largest spacing between the forming walls of any of the forming plates is at least ten centimeters; the polymer matrix comprises at least one polymer and more than 80 weight-percent of the polymers in the polymer matrix are selected from a group consisting of polystyrene homopolymers and polystyrene copolymers; more than 80 weight-percent of the polymer in the polymer matrix are selected from a group consisting of polystyrene homopolymer and styrene-acrylonitrile copolymer; more than 50 weight-percent of the polymer in the polymer matrix is polystyrene homopolymer; the blowing agent comprises carbon dioxide; the blowing agent comprise carbon dioxide and at least one of iso-butane and water; at least one constraining wall of one constraining section is continuous with a constraining wall of a sequential constraining section; constraining walls of one constraining section are distinct from constraining walls of a sequential constraining section; and at least one constraining wall of at least one of the constraining sections is temperature controlled.

The process of the present invention is useful for efficiently preparing low density and thick extruded polymeric foams that have a uniform density and compressive strength.

DETAILED DESCRIPTION OF THE INVENTION

All ranges include endpoints unless otherwise noted.

"And/or" means "and or as an alternative"

ASTM refers to American Society for Testing and Materials. ISO refers to International Organization for Standardization. EN refers to European Norm. ASTM, ISO and EN test methods refer to the method as of the year in the hyphenated suffix of the method number or, if there is no hyphenated suffice, the most recent method published prior to the priority date of the present document.

Extruded polymeric foams have at least one primary surface. The primary surface of extruded polymeric foam is a surface of the extruded polymeric foam that has a planar surface area equal to the highest planar surface area of any surface of the foam. A planar surface area is the surface area as projected onto a plane so as to neglect peaks and valleys in the surface. Polymeric foam may have more than one primary surface. Extruded polymeric foams having circular or oval cross sections have only one surface, which is by default the primary surface of the foam.

Thickness, width and length, when in reference to an extruded polymeric foam, refer to three mutually orthogonal dimensions of the extruded polymeric foam. Extruded polymeric foams exit an extruder through a foaming die (extrusion die) in an extrusion direction. Length is a dimension of the extruded polymeric foam that extends parallel to the extrusion direction of the foam. Thickness and width extend perpendicular to each other and mutually perpendicular to the length. Thickness is equal to or smaller than the width dimension. The thickness of foam extends perpendicular to a primary surface of the foam.

The present invention provides extruded polymeric foam that has essentially uniform density and essentially uniform compressive strength profiles along the thickness dimension of the foam. Determine the density profile of an extruded polymeric foam along the thickness dimension of the foam by cutting into 10-12 millimeter thick layers perpendicular to the thickness dimension (that is, maintain the length and width dimension in each layer). Measure the density for each layer according to the method of ISO 845-95. The combination of density values for all of the layers represents the density profile along the thickness dimension for the foam. Deviations in density between layers represent deviations along the thickness dimension. The extruded polymeric foam has an essentially uniform density profile along its thickness dimension if the difference between the density of any one layer from the average density of the maximum and minimum densities is less than 5%, preferably 4% or less, still more preferably 3% or less of the average density of the maximum and minimum densities.

Determine compressive strength in the thickness dimension in similar manner as the density profile except use 15 millimeter thick layers and measure compressive strength in the thickness dimension (15 millimeter dimension) according to the method of EN-826 for each layer. The combination of compressive strength values for all of the layers represents the compressive strength profile along the thickness dimension for the foam. Deviations in compressive strength between layers represent deviations along the thickness dimension. The extruded polymeric foam has an essentially uniform compressive strength profile along its thickness dimension if the difference between the compressive strength of any one layer from the average compressive strength of the layers having the highest and lowest compressive strengths is less than 10%, preferably 9% or less, still more preferably less than 9% of the average compressive strength of the maximum and minimum compressive strengths.

The process of the present invention is an extrusion process that includes the general steps of an extrusion process for preparing extruded polymeric foam: (1) providing a foamable polymer composition comprising a polymer matrix and a blowing agent at an initial pressure and temperature in an extruder; (2) expelling the foamable polymer composition into a zone of lower pressure than the initial pressure; and (3) allowing the foamable polymer composition to expand into a polymeric foam. In the present process, the foamable polymer composition expands in step (3) to a thickness expansion ratio of at least 30 to one. Expansion in step (3) occurs within constraints of forming plates that are of a specific configuration in order to surprisingly produce polymeric foam having a low density as well as an essentially uniform density and essentially uniform compressive strength throughout the thickness of the polymeric foam.

The polymer matrix of the foamable polymer composition comprises a polymer component containing all of the polymers in the foamable polymer composition. The polymer component can contain one type of polymer or a combination of more than one type of polymer. Desirably, alkenyl aromatic polymers account for 80 weight-percent (wt %) or more, and can account for 90 wt % or more and even 100 wt % of the total weight of the polymer component. Preferably, the alkenyl aromatic polymers are selected from a group consisting of styrene homopolymers and copolymers. Particularly desirable styrene copolymers include styrene-acrylonitrile copolymer. In one particularly desirable embodiment styrene homopolymer accounts for 50 wt % or more, preferably 75 wt % or more, still more preferably 85 wt % or more and can account for up to and including 100 wt % of the total weight of polymers in the polymer matrix (that is, of the polymer component).

The polymer matrix can further comprise additives such as those common in polymer foams. Examples of suitable additives include any one or any combination of more than one of the following: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers, phosphorous flame retardants such as triphenylphosphate, and flame retardant packages that may including synergists such as, for example, dicumyl and polycumyl); lubricants (for example, calcium stearate, barium stearate and fatty acid esters); and acid scavengers (for example, magnesium oxide and tetrasodium pyrophosphate).

The blowing agent of the foamable polymer composition can be any currently known or yet to be discovered blowing agent composition suitable for preparing polymeric foam by an extrusion process. Suitable blowing agents include any one or any combination of more than one of the following: inorganic gases such as carbon dioxide, argon, nitrogen, and air; organic blowing agents such as water, aliphatic and cyclic hydrocarbons having from one to nine carbons including methane, ethane, propane, n-butane, iso-butane, n-pentane, iso-pentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

One particularly desirable blowing agent is carbon dioxide that is optionally in combination with iso-butane, water or both iso-butane and water. Preferably, this blowing agent contains carbon dioxide in a range of 40-100 wt %, iso-butane in a range of 0-60 wt % and water in a range of 0-20 wt % with wt % based on total blowing agent weight.

The polymer component of the foamable polymer composition, has a softening temperature.

"Softening temperature" ($T_s$) for a polymer component whose polymers are all semi-crystalline is the melting temperature for the polymer component. "Melting temperature" ($T_m$) for a semi-crystalline polymer is the temperature halfway through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ using a heating rate of 10 degrees Celsius (° C.) per minute. If the polymer component only contains miscible polymers and only one crystalline-to-melt phase change is evident in its DSC curve, then $T_m$ for the polymer component is the temperature half-way through the phase change. If multiple crystalline-to-melt phase changes are evident in a DSC curve due to the presence of immiscible polymers, then $T_m$ for the polymer component is the $T_m$ of the continuous phase polymer. If more than one polymer is continuous and they are not miscible, then the $T_m$ for the polymer component is the highest $T_m$ of the continuous phase polymers.

The softening temperature for a polymer component whose polymers are amorphous is the glass transition temperature for the polymer component. "Glass transition temperature" ($T_g$) for a polymer component is as determined by DSC according to the procedure in ASTM method E1356-03. If the polymer component contains only miscible polymers and only one glass transition phase change is evident in the DSC curve, then $T_g$ of the polymer component is the temperature half-way through the phase change. If multiple glass transition phase changes are evident in a DSC curve due to the presence of immiscible amorphous polymers, then $T_g$ for the polymer component is the $T_g$ of the continuous phase polymer. If more than one amorphous polymer is continuous and they are not miscible, then the $T_g$ for the polymer component is the highest $T_g$ of the continuous phase polymers.

If the polymer component contains a combination of semi-crystalline and amorphous polymers, the softening temperature of the polymer component is the softening temperature of the continuous phase polymer component. If the semi-crystalline and amorphous polymer phases are co-continuous, then the softening temperature of the combination is the higher softening temperature of the two phases.

Provide the foamable polymer composition in an extruder at an initial temperature that is above the softening temperature for the polymer component and at an initial pressure that precludes foaming. In a broad sense, the present invention is independent of how one provides the foamable polymer composition into an extruder. Methods of providing the foamable polymer composition in an extruder can be part of preferred embodiments of the present invention.

Any extrusion process that can accommodate the specific forming plates, described below, is suitable for incorporating into the present invention. Therefore, there are many possible ways to provide a foamable polymer composition into an extruder at the initial temperature and initial pressure. One general procedure is to feed polymer in pelletized form into an extruder that is at a temperature sufficient to soften the polymer pellets enough to mix the polymer in the extruder. Additives can be included in the polymer pellets, added with the pellets into the extruder or added to the extruder downstream from the addition of the polymer pellets. It is common to add blowing agent to the softened polymer downstream from adding the polymer by injecting one or more than one blowing agent into the softened polymer in the extruder at a pressure that is at or exceeds the initial pressure. The extruder then can mix the blowing agent(s) into the softened polymer. Blowing agent can also reside in the polymer pellets prior to adding the pellets to an extruder. Typically, such a blowing agent is a chemical blowing agent residing in the polymer.

The present process requires expelling the foamable polymer composition from the extruder to an environment of lower pressure than the initial pressure and then allowing the foamable polymer composition to expand into polymeric foam. The foamable polymer composition remains at a temperature above the softening temperature of the polymer component until expelled into the environment of lower pressure but can be heated or cooled prior to expelling. It is common to expel the foamable polymer composition from an extruder through a foaming die into atmospheric pressure. The foaming die has an exit opening through which the foam passes that defines the general shape of the resulting polymeric foam. The foaming die exit opening can have any shape including rectangular, square, round, oval or even a non-symmetric shape. The foaming die can have multiple exit openings so that the foamable polymer composition exits the foaming die as multiple strands, multiple sheets, or any combination of shapes.

The foamable composition cools as it expands. Cooling can occur with or without affirmative application of a cooling medium (for example, chilled air or contact with cooled plates) or an annealing medium (for example, warmed air or contact with warmed plates). Often, cooling occurs without affirmative application of a cooling medium. As the foamable polymer composition cools it dimensionally stabilizes into final polymeric foam.

The surprising result of the present invention is due to the use of forming plates to control in a staged, or stepwise, expansion of the foamable polymer composition in the thickness dimension of the resulting polymeric foam. As the foamable polymer composition expands, the expansion is initially constrained in the thickness dimension by initial forming plates on opposing sides of the expanding foamable composition in the thickness dimension. The initial forming plates can be independent from one another or part of a single or modular structure (for example, a tube, tunnel or "C" shaped channel) through which the expanding foamable polymer composition travels as it moves in its extrusion direction. The initial forming plates have opposing forming walls (initial forming walls) that contact the foamable polymer composition and that are essentially parallel to one another and essentially parallel to the extrusion direction. "Essentially parallel" means that the distance between two forming walls at any two points on a forming wall is either equal or the smaller distance is within 5% of the larger distance. The initial forming walls are spaced apart from one another in the thickness dimension by an initial distance that is in a range of 10 to 40 times the height of the foaming die's exit opening. Preferably, the initial forming walls remain essentially parallel to one another for a distance along the extrusion direction, more preferably for a distance of 50 millimeters to 300 millimeters.

The expanding foamable polymer composition proceeds in the extrusion direction through the initial forming plates and then through a second set of forming plates (secondary forming plates) that have opposing forming walls (secondary forming walls) that constrain expansion of the foamable polymer composition in the thickness dimension of the resulting polymeric foam. The secondary forming walls are spaced further apart than the initial forming walls and are desirably, though not necessarily, essentially parallel to one another and the extrusion direction. The secondary forming walls preferably have a length in the extrusion direction that is in a range of 100 to 1500 millimeters. The spacing between secondary forming walls can differ at any two points by a factor of 2.5 or less, preferably a factor of 2 or less, still more preferably a factor of 1.5 or less. If the secondary forming walls are not essentially parallel the spacing between them where the polymeric foam exits from between them should be larger than the spacing where the polymer foam enters the spacing between them. The spacing between secondary forming walls where the polymer foam enters the space between them is desirably 1.01 to 2 times the largest spacing between the initial forming walls. As with the initial forming plates, the secondary forming plates can be independent from one another or part of a single or modular structure through which the expanding foamable polymer composition travels as it moves in its extrusion direction.

One or both of the secondary forming plates can be a continuous structure with one or both of the initial forming plates such that the constraining wall of two sequential constraining sections are continuous. For example, a single flat sheet of material can extend along the extrusion dimension and serve as one of the initial and one of the secondary forming plates. In another embodiment a single material can extend as a flat sheet of material for a distance in the extrusion dimension and then have a bend followed by another flat section extending for another distance with the two flat sections serving as initial and secondary forming plates. Forming plates of sequential constraining sections can also be independent and distinct from one another. Any combination or method of constructing two the forming plates and forming plate walls along the extrusion direction of an expanding foamable polymer composition are within the scope of the present invention as the method of constructing the plates is less important than the mere presence and sequence of the forming plates.

Each spacing between forming plate walls serves as a constraining section that restricts expansion of the foamable polymer composition in the thickness dimension of the polymeric foam. To constrain expansion effectively, the forming walls are wide enough to contact the entire width of the expanding foamable composition.

The process of the present invention includes forming plates that form at least two constraining sections, yet the process can have forming plates that form more than two constraining sections. Increasing the number of constraining sections provides better control over the expansion of the foamable polymer composition and is desirable as the desired foam thickness increases, particularly when the desired foam thickness exceeds 140 millimeters. For example, the process may include forming plates having essentially parallel forming walls that reside between the initial and secondary forming plates. Forming plates residing between the initial forming plates and secondary forming plates have essentially parallel forming walls that are spaced apart a distance within 5% of the largest distance between the initial forming plates. Additional forming plates may reside after the secondary forming plates and can be essentially parallel or non-parallel.

The initial forming plates can be directly adjacent to and even touching the foaming die or can be spaced away from the foaming die. The initial forming plates are within a distance from the foaming die that is equal to 25% of the length of the initial forming plates. If spaced apart from the foaming die, desirably the spacing between initial foaming walls is greater than the height of the foaming die exit opening. Desirably, a short (10 to 100 millimeter in length) section of non-parallel plates reside between the foaming die and initial forming plates if the initial forming plates are not directly adjacent to and in contact with the foaming die. These short sections of non-parallel plates are connector sections and because of their short length are not considered forming plates. These connector sections desirably direct an expanding foamable composition from the die exit opening into the space between the initial constraining walls.

Any set of forming plates can be directly adjacent to, in contact with, or spaced apart from a preceding as well as a subsequent set of forming plates. If one set of forming plates is set apart from a preceding or subsequent set of forming plates then there is a connector section of non-parallel plates that directs foamable polymer composition between the two sets of forming plates.

Forming plates, forming walls and connector sections can be made of any material, but are preferably made of a material and texture that produces minimal frictional force with the expanding foamable polymer composition. Constraining walls can comprise fluoropolymer resin, steel, aluminum, and can include a texture such as grooving, micropeening, etching and corrugated. Constraint can also be applied with constraining walls to restrain expansion of the foamable polymer composition in other dimensions besides the thickness dimension as desired and to any extent as desired.

One or more than one constraining wall in one or more than one constraining section can be thermally controllable. A thermally controllable constraining wall can be heated, cooled or can have the option of being heated or cooled to a desired temperature.

The forming plates and constraining walls are desirably designed to allow the foamable polymer composition to expand into polymeric foam having a thickness expansion ratio of 30 to one (30:1) or more, preferably 35:1 or more, still more preferably 40:1 or more. The thickness expansion ratio of a foam is the thickness of the polymeric foam divided by the dimension of the foaming die exit opening in the foam's thickness dimension (that is, the thickness of the foamable polymer composition as it exits the foaming die). Such a large thickness expansion ratio relates to a significant reduction in density and low density polymeric foam.

Foams prepared with a thickness expansion ratio of 30:1 or higher without using the process of the present invention tend to suffer from non-uniform density profiles along their thickness as well as non-uniform compressive strength profiles along their thickness. Without being bound by theory, foams having a thickness expansion ratio of 30:1 or more currently tend to suffer from non-uniform density profiles and compressive strength profiles in the thickness dimension because of a pressure drop gradient that develops along the thickness dimension of the foam. The pressure drop gradient causes a non-uniform expansion of the bubbles forming foam cells. As a result, portions of foam proximate to the surface expand more than portions of foam proximate to the center or core of the foam.

Surprisingly, the process of the present invention is capable of producing extruded polymeric foam that has an essentially uniform density and compressive strength profiles along the thickness dimension while concurrently having a thickness expansion ratio of 30:1 or higher. Likewise, the present invention can produce extruded polymeric foam having a thickness of 10 centimeters or more that has an essentially uniform density and compressive strength profiles along the thickness dimension. The thickness of the extruded polymeric foam produced by the present process is at least as large at the largest spacing of the forming walls, recalling that the forming walls contact the foamable polymer composition and constrain expansion in the thickness dimension as the foamable polymer composition becomes the extruded polymeric foam. In one desirable embodiment, the largest spacing between forming walls is 10 centimeters or more in order to produce a polymeric foam having a thickness of 10 centimeters or more.

Even more surprisingly, the process of the present invention is capable of producing extruded polymeric foam having a thickness expansion ratio of 30:1 or more, a thickness of 10 centimeters or more, or both a thickness expansion ratio of 30:1 or more and a thickness of 10 centimeters or more while also having a high quality surface appearance. A foam has a "high quality surface appearance" if 98% or more, preferably 99% or more, most preferably 100% of any 200 square-centimeter portion of any primary surface of the foam that is centered on the foam's primary surface and extending to 80% of the foam's width is free of defects. A "defect" is a discontinuity in polymer that provides access to more than one cell of the foam through a primary surface of the polymer foam. Defects are apparent directly out of the foaming die and are distinct from intentionally milled grooves or slices introduced into foam after a foaming die.

The process of the present invention can produce extruded polymeric foam having essentially uniform density and compressive strength profiles in the foam's thickness dimension of virtually any thickness provided the extruded polymeric foam has a thickness expansion ratio of 30:1 or more. Particularly challenging, however, is production of extruded polymeric foam having a thickness of 10 centimeters or more that also has a thickness expansion ratio of 30:1 or more which the process of the present invention is also capable of achieving.

Yet more challenging is preparing extruded polymeric foams having essentially uniform density and compressive strength profiles in the foam's thickness dimension when cross sectional areas become large. The process of the present invention is capable of preparing extruded polymeric foams having essentially uniform density and compressive strength profiles in the foam's thickness dimension that also have cross sectional areas of 300 square centimeters or higher.

Preferred extruded polymeric foams prepared by the present invention have an average cell size as determined by ASTM method D-3576 of 0.1 millimeters or more, more preferably 0.25 millimeters or more, still more preferably 0.5 millimeters or more and preferably have a cell size of 1.5 millimeters or smaller.

The extruded polymeric foams prepared by the present invention can have a unimodal cell size distribution or a multimodal (for example, bimodal) cell size distribution. The extruded polymeric foams of the present invention desirably have a unimodal cell size distribution in order to optimize thermal insulating properties. An extruded polymeric foam has a unimodal cell size distribution if a plot of cell size (rounded to the nearest 0.02 millimeter) versus number of cells displays a single peak. A "peak" is a point on a plot that has at least three points having a lower y-axis value both prior to and after it, progressing along the plot's x-axis, before there is a point having a higher y-axis value. A peak can comprise more than one point of equal y-axis values (a plateau), provided the point on either side of the plateau (progressing along the plot's x-axis) has a lower y-axis value than the points comprising the plateau. The plot should contain characterizations of at least 100 cells randomly selected from a complete cross section of the extruded polymeric foam. Use the average of the largest and smallest cell diameter as the cell size for a given cell.

Extruded polymeric foam that is manufactured using the process of the present invention can have nearly spherical cells or even spherical cells. Nearly spherical cells have a maximum aspect ratio (that is, the largest diameter divided by the smallest diameter) of less than 1.5. Spherical cells have a maximum aspect ratio in a range of 0.9 to 1.0. Determine whether extruded polymeric foam has nearly spherical or spherical cells by examining cross sectional views of at least 100 cells of the polymeric foam. Polymeric foams with a unimodal cell size whose cells are spherical, or nearly spherical, experience more compressive strengths values that tend to be uniform, or nearly uniform, regardless of what foam dimension the compressive strength is measured.

Foam prepared by the present invention desirably has a density of 60 kilograms per cubic meter ($kg/m^3$) or less, preferably 45 $kg/m^3$ or less and still more preferably 36 $kg/m^3$ or less. Typically, foam prepared by the present invention has a density of 10 $kg/m^3$ or more in order to achieve sufficient mechanical integrity for handling.

EXAMPLES

The following example serves to further illustrate embodiments of the present invention.

Example 1

Prepare extruded polystyrene foam of polystyrene homopolymer by providing a foamable polymer composition comprising a homogeneous blend of polystyrene homopolymer (145,000 grams per mole weight-averaged molecular weight), 3.6 weight parts carbon dioxide and 1.0 weight-parts iso-butane at 215° C. and 184 bar in an extruder. Weight parts are relative to 100 weight parts polystyrene homopolymer. Cool the foamable polymer composition to 117° C. and extrude through a foaming die at a pressure of 89 bar. The die has exit opening dimensions of 2.44 millimeters high and 245 millimeters wide.

The foamable polymer composition proceeds through the foaming die and into a first constraining section as it begins to expand. Opposing forming plate walls spaced 47 millimeters apart and extending for 180 millimeters in the extrusion direction, parallel to the extrusion direction and equally spaced from the expanding foamable polymer composition, define the first constraining section. The expanding foamable polymer composition immediately enters a second constraining section as it leaves the first constraining section. The second constraining section has opposing forming plate walls spaced 67.2 millimeters apart and extending for 850 millimeters in the extrusion direction and parallel to the extrusion direction. One of the forming plate walls is planar with a forming plate wall of the first constraining section while the opposing forming plate wall (that which is generally above the expanding foamable polymer composition) is parallel to but not coplanar with either of the foaming plates of the first constraining section. The foamable polymer composition exits the second constraining section as a final extruded polymeric foam.

The final extruded polymeric foam has a thickness of 120 millimeters and a width of 725 millimeters. The thickness expansion ratio of the extruded polymeric foam is 49.2. The final extruded polymeric foam has an average density of 34.3 kilograms per cubic meter ($kg/m^3$). The extruded polymeric foam has a high quality surface appearance as defined prior.

Comparative Example A

Prepare Comparative Example A (Comp Ex A) in like manner as Example 1 except: (1) extrude through a foaming die having an exit opening height of 2.66 millimeters (dimension in the thickness dimension of the foam); and (2) only use the first constraining section after the foaming die (that is, expose the foamable polymer composition to only the first constraining section and do not use the second constraining section).

The final extruded polymeric foam has a thickness of 120 millimeters and a width of 745 millimeters. The thickness expansion ratio of the extruded polymeric foam is 45.1. The final extruded polymeric foam has an average density of 34.3 kg/m³. The extruded polymeric foam has a high quality surface appearance as defined prior.

Determine a density profile along the thickness dimension of both Example 1 and Comp Ex A by slicing the foams into ten layers that each is 10 millimeters thick. Table 1 contains density values for each layer of each foam, with Layer 1 corresponding to the top and number consecutively until Layer 10, which corresponds to the bottom of the foam.

Determine a compressive strength profile along the thickness dimension of both Example 1 and Comp Ex A by removing the skins from the primary surfaces of each foam and then slicing the foams into seven layers that are each 15 millimeters thick. Table 1 contains compressive strength values for each layer of each foam, with Layer 1 corresponding to the top and numbered consecutively to as the layers approach the bottom of the foam.

TABLE 1

| Layer | Density (kg/m³) | | Compressive Strength (kilopascals) | |
|---|---|---|---|---|
| | Comp Ex A | Example 1 | Comp Ex A | Example 1 |
| 1 | 30.4 | 35.2 | 269 | 363 |
| 2 | 34.9 | 35.2 | 342 | 368 |
| 3 | 35.6 | 34.2 | 343 | 344 |
| 4 | 35.2 | 34.4 | 347 | 329 |
| 5 | 35.1 | 34.2 | 346 | 347 |
| 6 | 35.3 | 33.9 | 348 | 360 |
| 7 | 35.6 | 34.5 | 255 | 378 |
| 8 | 35.4 | 34.4 | | |
| 9 | 34.3 | 34.5 | | |
| 10 | 30.1 | 34.7 | | |

Density Analysis

For Comp Ex A, it is clear that the foam has a lower density near the top and bottom surfaces as compared with the core of the foam. The average of the maximum and minimum densities is (35.6+30.1)/2 or 32.85 kg/m³. The difference between the density of Layer 10 and Layer 3 from the average of the maximum and minimum is 2.75 kg/m³, or 8.4% of the average of the maximum and minimum. Therefore, Comp Ex A does not qualify as having an essentially uniform density profile along the thickness dimension.

Example 1 has a more uniform density profile. The average of the maximum and minimum densities is 34.55 kg/m³. The difference of the density of Layers 1 and 2 (maximum density layers) and the density of Layer 6 (minimum density layer) relative to the average of the maximum and minimum is 0.65 kg/m³, or 1.9%. Therefore, Example 1 qualifies as having an essentially uniform density profile along the thickness dimension.

Compressive Strength Analysis

For Comp Ex A, it is clear that the foam has a lower compressive strength near the top and bottom surfaces as compared with the core of the foam. The average of the maximum and minimum densities is (348+255)/2 or 301.5 kilopascals. The difference between the compressive strength of Layer 6 and Layer 7 from the average of the maximum and minimum is 46.5 kilopascals, or 15% of the average of the maximum and minimum. Therefore, Comp Ex A does not qualify as having an essentially uniform compressive strength along the thickness dimension.

Example 1 has a more uniform density profile. The average of the maximum and minimum compressive strengths is 353.5 kilopascals. The difference of the compressive strength of the maximum or minimum relative to the average of the maximum and minimum is 24.5 kilopascals, or 6.9%. Therefore, Example 1 qualifies as having an essentially uniform compressive strength along the thickness dimension.

A comparison of Example 1 with Comp Ex A illustrates a surprising aspect of the present invention—that using step-wise expansion with at least two constraining sections enables direct manufacture (that is, manufacture without post-formation processing or modification of the foam) of extruded polymeric foam having an essentially uniform density profile and compressive strength profile along the thickness dimension.

The invention claimed is:

1. A process for preparing extruded polymeric foam comprising the following steps:
   a. providing a foamable polymer composition in an extruder at an initial temperature and an initial pressure, the foamable polymer composition comprising a blowing agent and a polymer matrix that comprises a polymer component with a softening temperature, the initial temperature exceeding the softening temperature of the polymer component and the initial pressure high enough to preclude foaming of the foamable polymer composition; and
   b. extruding the foamable polymer composition in an extrusion direction into an atmosphere at a pressure below the initial pressure and allowing the foamable polymer composition to expand into a polymeric foam prior to cooling to a temperature below the softening point of the foamable polymer composition;
   wherein prior to cooling to a temperature below the softening point in step (b), the foamable polymer composition expands with a thickness expansion ratio of at least 30:1 while traveling through and contacting opposing forming plates that provide at least two sequential constraining sections along the extrusion direction, the forming plates in each constraining section comprising essentially parallel constraining walls that restrict expansion of the foamable polymer composition in a thickness dimension and wherein the constraining section closest to the extruder has essentially parallel walls defining a spacing in the thickness dimension that is smaller than the spacing of parallel walls defining the second constraining section and wherein the polymer composition expands into a polymeric foam having a thickness of 10 centimeters or more and essentially uniform density and compressive strength profiles along the thickness dimension of the polymeric foam.

2. The process of claim 1, wherein the largest spacing between the forming walls of any of the forming plates is at least ten centimeters.

3. The process of claim 1, wherein the polymer matrix comprises at least one polymer and more than 80 weight-percent of the polymers in the polymer matrix are selected from a group consisting of polystyrene homopolymers and polystyrene copolymers.

4. The process of claim 1, wherein more than 80 weight-percent of the polymer in the polymer matrix are selected from a group consisting of polystyrene homopolymer and styrene-acrylonitrile copolymer.

5. The process of claim 1, wherein more than 50 weight-percent of the polymer in the polymer matrix is polystyrene homopolymer.

6. The process of claim 1, wherein the blowing agent comprises carbon dioxide.

7. The process of claim 1, wherein the blowing agent comprise carbon dioxide and at least one of iso-butane and water.

8. The process of claim 1, wherein at least one constraining wall of one constraining section is continuous with a constraining wall of a sequential constraining section.

9. The process of claim 1, wherein constraining walls of one constraining section are distinct from constraining walls of a sequential constraining section.

10. The process of claim 1, wherein at least one constraining wall of at least one of the constraining sections is temperature controlled.

11. The process of claim 1, further characterized by extruding the foamable polymer composition in step (b) from an extruder through a foaming die into atmosphere pressure.

* * * * *